May 1, 1951 C. C. DAVIS 2,550,916

METHOD OF MOUNTING A MAGNETIC TRANSLATING HEAD

Filed Oct. 19, 1948

INVENTOR
C. C. DAVIS
BY
G. H. Heydt
ATTORNEY

Patented May 1, 1951

2,550,916

UNITED STATES PATENT OFFICE 2,550,916

METHOD OF MOUNTING A MAGNETIC TRANSLATING HEAD

Charles C. Davis, West Los Angeles, Calif., assignor to Western Electric Company, Incorporated, New York, N. Y., a corporation of New York Application October 19, 1948, Serial No. 55,327

1 Claim. (Cl. 274—4)

This invention relates to magnetic recording and reproducing machines and more particularly to a method and means of mounting a translating magnetic head employed in such machines.

It is foreseen, with the advent of new and better types of magnetic coatings on film or tape, that magnetic recording and reproducing will be used more extensively in the motion picture industry. While it is desirable to use magnetic recording and reproducing machines in the motion picture field, it is of utmost importance that the velocity of the magnetic record-carrying film be maintained constant at the translating point in order to obtain high quality recording or reproducing. It is evident therefore that it is necessary to mount the translating magnetic head at a point where the velocity of the film is constant and at the same time prevent the introduction of flutter in recording or reproducing.

In the motion picture field it has long been recognized that speed variations seriously degrade the finest sound recordings. The harshness caused by high-frequency flutter and the "wows" caused by low-frequency flutter are well known. Various types of drives are described by Albersheim and MacKenzie in an article entitled "Analysis of Sound-Film Drives" published in the Society of Motion Picture Engineers Journal, volume 37, November, 1941, pages 452 to 479. Although the invention may be used with any one of the drives described by Albersheim and MacKenzie, it may be used with any form of film or tape drive.

It is the object of this invention to provide improved equipment for the magnetic recording and reproducing of sound.

Since magnetic recording or reproducing requires actual physical contact of the magnetic head with the film or tape, it is proposed by means of this invention to permit controlled contact with the film at a point where the velocity of the film is constant so as not to introduce flutter in the recording or reproducing process.

In accordance with this invention, a translating magnetic head is mounted in contact with the inner surface of a film which overhangs an edge of a supporting drum. The drum is driven at a uniform velocity in any desired manner. The film acts as a carrier for a magnetic record which is preferably in the form of a finely divided iron oxide powder. The magnetic head is mounted on a spring-pressed pivoted arm which is provided with a dash-pot plunger to supply damping.

The invention will be more readily understood from the following specification when read in connection with the accompanying drawings in which.

Figures 1, 2, 3:
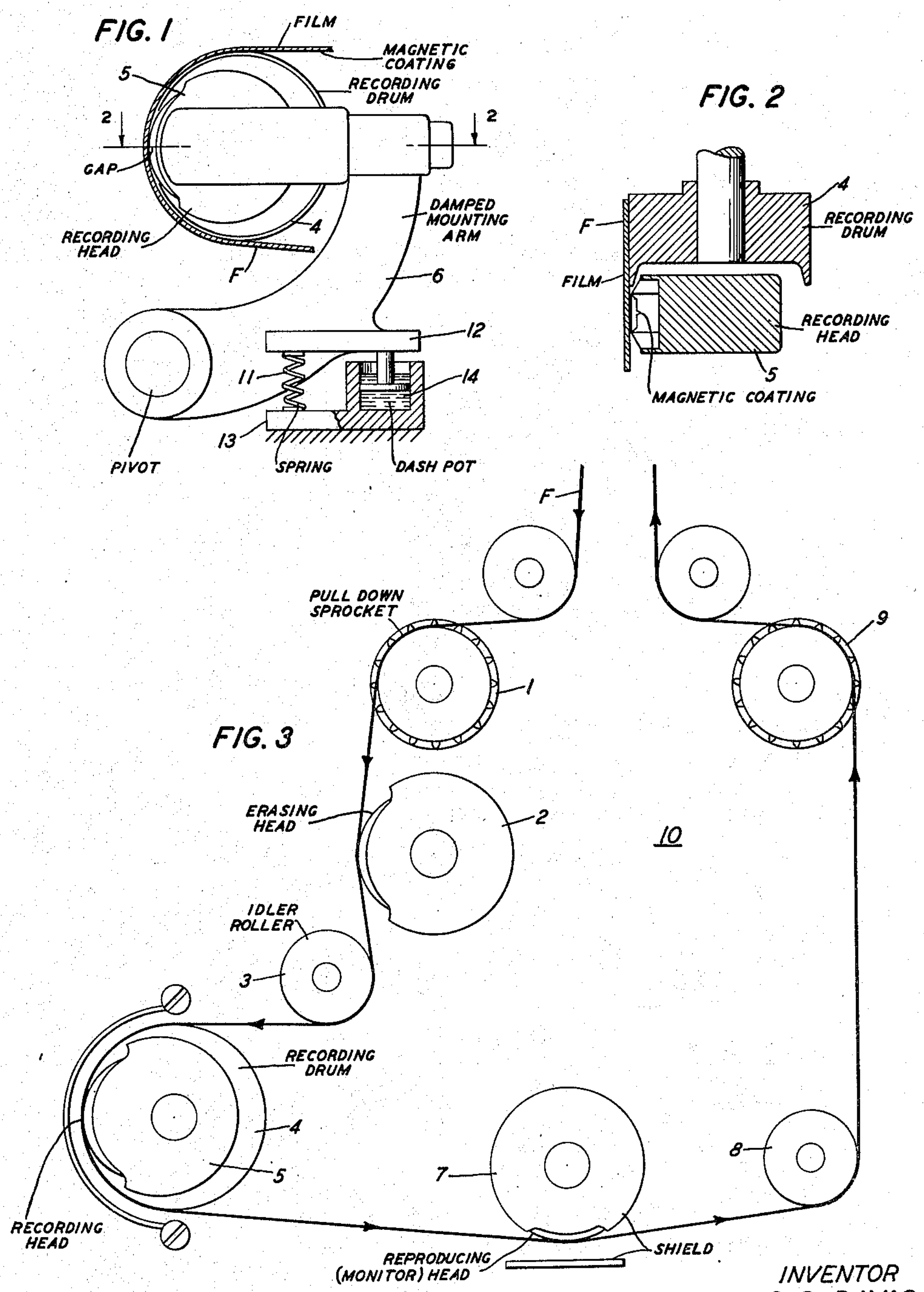
Fig. 1 is a side elevation of the translating magnet assembly.
Fig. 2 is a section taken through lines 2—2 of Fig. 1.
Fig. 3 is a general layout of a sound film drive employing the proposed mounting for the recording head.

In the drawing, the apparatus shown is suitably mounted on a wall 10 of the housing of a recording or reproducing machine. A film F having at one side thereof a magnetic record which is preferably in the form of finely divided iron oxide particles is driven by a pull-down sprocket 1 from a supply reel (not shown). The film is similar to conventional sound picture films, but for the purpose of the present invention it is assumed that the area ordinarily occupied by a photographic sound record has been prepared for the reception of a magnetic sound record. However, it is understood that any form of film or tape which carries a magnetic record extending across all or a part of the width of the film or tape may be used.

The film passes over an erasing head 2 and under an idler roller 3 and engages a recording drum 4 with the magnetic record thereof overhanging the near edge of the drum, as shown in Fig. 2. The drum may be suitably connected to a fly-wheel as described in the above article by Albersheim and MacKenzie. A recording head 5 is mounted on a damped supporting arm 6, shown in detail in Fig. 1 which will be described later. Although details of the recording head are not shown since the invention does not lie in the head itself, any form of recording head of well-known construction having a magnetic core with a narrow gap may be used. An energizing coil suitably mounted on the core may be modulated by sound currents, as is well known in the art, to suitably impress changes in magnetic flux on the magnetic portion of the film as it passes the gap. The recording head is in contact with the magnetic coating. A reproducing or monitoring head 7 which may be of a type similar to the recording head, is mounted above the tight loop following the recording drum between the drum and an idler roller 8. The film F is then taken up by a take-up sprocket 9 and reeled onto a take-up reel (not shown).

The manner of mounting the recording head 5 is indicated in Fig. 1. The recording drum 4 is somewhat narrower than the film F, as shown in Fig. 2. The film F overhangs an edge of the drum. The film is threaded so that the magnetic coating is on the inside of the loop. The gap of the recording head contacts the inside of the overhanging loop. The recording head is mounted on the arm 6 and positioned as close to the drum as possible. The arm is pivoted on the wall 10 of the recording machine at a point whose locus is on a line which is tangent to the scanning drum at the point where the recording gap is applied to the film. A compression spring 11 is attached at one end to the arm 6 by means of a member 12 suitably mounted on the arm and connected at the other end to a member 13 suitably mounted on the wall 10. The spring supplies sufficient force to hold the recording gap against the film F. The spring tension may be made adjustable if desired. The arm motion is damped by an oil-filled dash-pot 14 suitably mounted between the members 12 and 13.

When the force of the arm is properly adjusted, the uniformity of film motion is comparable to that obtained in sound film drives of the type described by Albersheim and MacKenzie. This is largely due to the fact that the film loop being rigidly supported over most of its width is not so subject to polygoning at the film perforations. Furthermore, the head automatically assumes the proper position when the film is threaded, any wear on the head being compensated by a slight motion of the arm. In addition thereto, dash-pot damping discourages loss of contact due to unevenness of the film surface and speeds recovery from splices.

The apparatus may be employed as a reproducer in which case the translating head may act as a reproducing head to provide high quality, flutter-free reproduction of the magnetic recording. Obviously when the translating head is used as a reproducing head, the monitoring head shown in the drawing may be dispensed with.

If the magnetic recording material is carried by a narrow film or tape, or is so positioned with respect to the edges of the tape that it is impracticable to provide an overhanging portion for engagement by the translating head, it may be desirable to modify the apparatus to some extent. In such instances the tape may be applied to the translating drum in a manner such that the recording material appears on the convex side of the film as it passes over the drum. The translating head, supported by a spring-pressed bracket identical with the bracket described hereinbefore, is then brought into cooperative contact with the magnetic material. This alternative embodiment of the invention will retain a good many of the advantages previously discussed in connection with the preferred embodiment.

In accordance with the provisions of the patent statutes, the principle of operation of the invention, together with the apparatus now considered to represent the best embodiment thereof, has been described; but it is desired to have it understood that the apparatus shown is only illustrative, and that the invention can be carried out by other means.

What is claimed is:

The combination in a magnetic recording or reproducing machine, of a drum suitably mounted on a wall of a machine, means for driving said drum at uniform velocity, a film supported by said drum, a portion of said film overhanging an edge of said drum, a magnetic record carried by the overhanging portion of said film, a magnetic translating head in contact with the inner surface of said magnetic record, said translating head including a translating gap situated in a curved portion of said head, a pivoted arm on which said translating head is mounted, a pivot point for said arm, the locus of said pivot point being a line which is tangent to the curve of the recording head at the point where the record engages the translating gap, and a damped spring connected to said arm to urge said translating head into contact with the inner surface of said magnetic record.

CHARLES C. DAVIS.

REFERENCES CITED

The following references are of record in the file of this patent:

UNITED STATES PATENTS

| Number | Name | Date |
|---|---|---|
| 873,084 | Poulsen | Dec. 10, 1907 |
| 2,257,028 | Westerkamp | Sept. 23, 1941 |
| 2,468,224 | Munson | Apr. 26, 1947 |
| 2,445,762 | Chanal | July 27, 1948 |

FOREIGN PATENTS

| Number | Country | Date |
|---|---|---|
| 69,273 | Norway | May 28, 1945 |